US012747482B2

(12) United States Patent
Monteverde et al.

(10) Patent No.: US 12,747,482 B2
(45) Date of Patent: Sep. 29, 2026

(54) USE OF EPOXIDIZED VEGETABLE OILS AS TANNING AGENTS

(71) Applicant: WORKEM S.R.L. UNIPERSONALE, Pisa (IT)

(72) Inventors: Giacomo Monteverde, Fucecchio (IT); Giuseppe Monteverde, Pisa (IT); Massimiliano Franceschi, Leghorn (IT); Silvia Pierozzi, Collesalvetti (IT); Antonio Cecchi, Pisa (IT)

(73) Assignee: Workem S.R.L. Unipersonale, Pisa (IT)

( * ) Notice: Subject to any disclaimer, the term of this patent is extended or adjusted under 35 U.S.C. 154(b) by 243 days.

(21) Appl. No.: 18/697,847

(22) PCT Filed: Oct. 6, 2022

(86) PCT No.: PCT/IB2022/059542
§ 371 (c)(1),
(2) Date: Apr. 2, 2024

(87) PCT Pub. No.: WO2023/057944
PCT Pub. Date: Apr. 13, 2023

(65) Prior Publication Data

US 2025/0003019 A1 Jan. 2, 2025

(30) Foreign Application Priority Data

Oct. 6, 2021 (IT) ........................ 102021000026528

(51) Int. Cl.

| | |
|---|---|
| ***C14C 3/12*** | (2006.01) |
| ***C14C 3/20*** | (2006.01) |
| ***C14C 9/04*** | (2006.01) |
| ***D06P 1/00*** | (2006.01) |
| ***D06P 3/32*** | (2006.01) |

(52) U.S. Cl.
CPC .................. *C14C 3/12* (2013.01); *C14C 3/20* (2013.01); *C14C 9/04* (2013.01); *D06P 1/0016* (2013.01); *D06P 3/32* (2013.01)

(58) Field of Classification Search
None
See application file for complete search history.

(56) References Cited

U.S. PATENT DOCUMENTS 2,795,478 A 6/1957 Filachione et al.

FOREIGN PATENT DOCUMENTS

| | | | |
|---|---|---|---|
| CN | 1186412 | A | 7/1998 |
| CN | 101518228 | A | 9/2009 |
| CN | 101550459 | A | 10/2009 |
| WO | 9639828 | A1 | 12/1996 |

OTHER PUBLICATIONS

Fengxia, C, "Application of Surfactants in Leather Production", China Surfactant Detergent & Cosmetics, 32(2), Apr. 30, 2002, 65-68.

*Primary Examiner* — Arti Singh-Pandey
(74) *Attorney, Agent, or Firm* — Elmore Patent Law Group, P.C.; Joseph C. Zucchero; Carolyn S. Elmore

(57) ABSTRACT

The present invention relates to the tanning industry and in particular to the use of an epoxidized vegetable oil as a tanning agent in at least one step of the leather processing process of the tanning industry.

23 Claims, No Drawings

USE OF EPOXIDIZED VEGETABLE OILS AS TANNING AGENTS

FIELD OF THE INVENTION

The present invention relates to the tanning industry and in particular to the use of an epoxidized vegetable oil as a tanning agent in at least one step of the leather processing process of the tanning industry.

BACKGROUND ART

The leather processing processes of the tanning industry are known to use numerous chemical products of various kinds and are characterized by numerous different treatment steps, aimed at obtaining a finished product endowed not only with high hydrothermal stability, resistance to chemical agents, and resistance to bacterial and enzymatic agents, but also with other related properties such as softness, flexibility, fullness, firmness, compactness, dyeability.

Although each tannery has in fact developed its own characteristic tanning process, the steps of the tanning process are generally grouped into four large blocks: preparation for tanning, operations also called "preparatory" include the initial steps of the treatment, tanning, in which the leathers are put into contact with one or more tanning agents that are irreversibly fixed and prevent their putrefaction without altering their softness and flexibility; retanning, a further treatment with tanning agents, different or the same as the one used for the "main" tanning, which gives the leathers a greater mechanical resistance and uniformity, but also softness, elasticity and lightness; and finally post-tanning treatments, including greasing, dyeing, finishing and all the final operations in order to perfect and finish the tanned leathers in view of the final use by the user. Among the steps of the tanning process, the tanning and retanning steps therefore assume a fundamental role, as they are certainly those that predominantly determine and give the leather its main final characteristics.

Given the extreme variability of production needs and the complexity of the entire processing cycle, it is no wonder that even in the tanning sector there is a continuous and growing demand for new tanning products that can be used to obtain finished products with the desired characteristics.

All the chemical products used in the various steps of the tanning process must also not only guarantee that the properties pursued in the specific step of use of the agent are achieved without affecting the productivity of the step itself, but also integrate with the subsequent processing steps, so as not to compromise the performance of the entire process; the identification of new products to be included in the production process, and especially of new tanning products, is therefore an extremely difficult challenge.

SUMMARY OF THE INVENTION

Aim of the present invention is therefore to identify a new tanning agent, capable of being effectively used in the tanning and retanning steps of the leather processing process of the tanning industry while maintaining adequate productivity characteristics and able to integrate successfully with the subsequent processing steps.

In accordance with the present invention, the Applicant has surprisingly found that it is possible to pursue said purposes by using an epoxidized vegetable oil as a tanning agent.

Thus, in a first aspect thereof the present invention relates to the use of an epoxidized vegetable oil as a tanning agent in at least one step of the leather processing process of the tanning industry.

In particular, the present invention relates to the use of an epoxidized vegetable oil as a tanning agent in the leather tanning step of the tanning industry.

The Applicant has in fact surprisingly found that the specific reactivity and structural characteristics of the epoxidized vegetable oils allow to meet the triple need to irreversibly fixate on the leathers being processed, preventing their putrefaction, while maintaining the other technical characteristics required of the tanned leathers such as softness, flexibility, mechanical resistance, uniformity, elasticity and lightness, as well as ensuring adequate tanning times for their use in normal leather processing processes, so as not to alter their productivity or impose modifying the process with respect to processes that use traditional tanning agents (based on chromium or vegetables such as aldehydes or tannins), and in any case to always allow obtaining a semi-finished product with suitable characteristics for the subsequent processing steps.

Preferably, the epoxidized vegetable oil according to the present invention is selected from the group consisting of: epoxidized hemp oil, epoxidized soybean oil, epoxidized sunflower oil, epoxidized olive oil, epoxidized linseed oil, epoxidized cotton oil, epoxidized karanja oil, epoxidized castor oil, epoxidized peanut oil, epoxidized corn oil, epoxidized rapeseed oil and combinations thereof.

Epoxidized hemp oil is particularly preferred.

In a second and preferred aspect, the present invention further relates to a process for tanning a leather comprising the steps of:

(a) suspending a leather to be tanned in an aqueous medium;
(b) bringing the pH of said aqueous medium of step (a) to a value from 3 to 8; and
(c) contacting the leather of step (b) with at least one epoxidized vegetable oil.

The use of the epoxidized vegetable oils in the tanning step is particularly advantageous in that it allows the tanning step to be carried out over a wide pH range of operating conditions, making it possible to operate under optimal processing conditions even in relation to other additives and without the need for any catalyst.

In a particularly preferred condition of the invention step (b) is carried out in a pH range from 3.5 to 4.5, more preferably from 3.7 to 4.3.

In particular, the choice of a pH range from 3.7 to 4.3 during the tanning step surprisingly favours the penetration of the tanner into the leather and therefore allows to make the tanning step much more effective, obtaining tanned leathers with superior quality characteristics.

The advantages and the characteristics of said further aspect of the invention, thanks to the use of an epoxidized vegetable oil as a tanning agent, have already been highlighted with reference to the first aspect of the invention itself and are not repeated herein.

In a further aspect the present invention further relates to an aqueous emulsion comprising at least one epoxidized hemp oil and at least one emulsifying agent.

The use of the epoxidized oil in an aqueous solution in combination with an emulsifying agent facilitates in fact the contact of the epoxidized vegetable oil with the leather to be treated, favouring its absorption and reactivity.

In a still further aspect, the present invention finally relates to the use of an epoxidized vegetable oil as a tanning agent in the leather retanning step.

DETAILED DESCRIPTION OF THE INVENTION

The present invention relates in a first aspect thereof to the use of an epoxidized vegetable oil as a tanning agent in at least one step of the leather processing process of the tanning industry.

The Applicant has in fact surprisingly found that it is possible to pursue said purposes by using an epoxidized vegetable oil as a tanning agent. In fact, the specific combination of structural and reactivity characteristics of the epoxidized vegetable oils make it possible to meet the multiple needs that a tanning agent must meet in order to be effectively used in a leather processing process in the tanning industry.

In fact, in addition to being able to irreversibly fixate on the leathers being processed, preventing their putrefaction, while maintaining the other technical characteristics such as softness, flexibility, mechanical resistance, uniformity, elasticity and lightness, epoxidized vegetable oils also guarantee adequate tanning times for their use in normal leather processing processes, without therefore altering productivity or requiring changes with respect to the processes that use traditional tanning agents (based on chromium or vegetables such as aldehydes or tannins), and by obtaining a semi-finished product with suitable characteristics they successfully integrate with the subsequent processing steps.

In the context of this description and in the subsequent claims, all numerical magnitudes indicating quantities, parameters, percentages, and so on are to be understood as preceded in all circumstances by the term "about" unless otherwise indicated. In addition, all the ranges of numerical magnitudes include all possible combinations of the maximum and minimum numerical values and all the possible intermediate ranges, in addition to those specifically indicated below.

The present invention can have, in one or more of its aspects, one or more of the preferred characteristics set forth below, which can be combined as desired with each other according to the application requirements.

The present invention relates to a new use of an epoxidized vegetable oil.

As is known, the main constituents of the vegetable oils are triglycerides, an esterification product of glycerin with three fatty acid molecules; the fatty acid content is characteristic of each type of vegetable oil and they can be saturated or unsaturated, i.e. they have one or more carbon-carbon double bonds. Epoxidized vegetable oils are chemical derivatives of vegetable oils in which one or more carbon-carbon double bonds have been oxidized to give an epoxidized structure.

Several methods are known for the preparation of epoxidized vegetable oils, including for example a first method involves the reaction of the carbon-carbon double bonds present in the vegetable oil with peracetic acid, formed in situ from acetic acid and $H_2O_2$, and in the presence of an acidic ion exchange resin used as a heterogeneous catalyst, described in the publication T. I. Conney, F. Cardona, & T. Tran-Cong, "Kinetics of in situ epoxidation of hemp oil under heterogenous reaction conditions: an overview with preliminary results", Energy, Environment and Sustainability, 2011, 106-111. Another method for the preparation of epoxidized oils instead involves the use of performic acid, generated in situ by formic acid and $H_2O_2$ and described in the publication T. S. Omonov, E. Kharraz and J. M. Curtis, "The epoxidation of canola oil and its derivatives", RSC Advances, 2016, 6, 92874-92886) (T. S. Omonov, V. Patel, J. M. Curtis, "The development of epoxidized hemp oil prepolymers for the preparation of thermoset networks", J Am Oil Chem Soc, 2019.

Preferably, the epoxidized vegetable oil according to the present invention is selected from the group consisting of: epoxidized hemp oil, epoxidized soybean oil, epoxidized sunflower oil, epoxidized olive oil, epoxidized linseed oil, epoxidized cotton oil, epoxidized karanja oil, epoxidized castor oil, epoxidized peanut oil, epoxidized corn oil, epoxidized rapeseed oil and combinations thereof.

In a particularly preferred embodiment, the epoxidized vegetable oil according to the present invention is epoxidized hemp oil.

The epoxide content of an epoxidized vegetable oil is normally expressed through different characteristic magnitudes, for example by the "epoxidation degree", which expresses the equivalents of epoxy groups present in 100 grams of oil.

Preferably, the epoxidized vegetable oil according to the present invention has an epoxidation degree of at least 0.10 equivalent epoxy groups/100 g of oil, more preferably of at least 0.15 equivalent epoxy groups/100 g of oil, even more preferably of at least 0.30 equivalent epoxy groups/100 g of oil.

The epoxidation degree of the epoxidized vegetable oil according to the present invention is advantageously determinable by titration with hydrobromic acid in glacial acetic acid, employing the standard method ASTM D 1652-97.

The epoxidized vegetable oil according to the present invention has been shown to be able to irreversibly fixate in the leathers being processed and to act effectively as a tanning agent in the processing steps of the leathers using these types of agents.

Preferably, the epoxidized vegetable oil according to the present invention is used in the tanning step of the leather processing process.

Preferably, when used as a tanner in said tanning step, the epoxidized vegetable oil has an epoxidation degree of at least 0.30 equivalent epoxy groups/100 g of oil.

Particularly preferred is the epoxidized hemp oil having an epoxidation degree greater than 0.30 equivalent epoxy groups/100 g of oil which was shown in all the experiments carried out to be particularly performing.

Surprisingly, in fact, it was observed that its tanning effect, expressed by the value of the shrinkage temperature Tg of the tanned leather, was comparable with that obtained, under the same reaction conditions, by treatment with an epoxidized soybean oil having more than 20% more of epoxidized double bonds and therefore a much greater oxidizing capacity than the hemp epoxidized one against the leather fibres.

The use of the epoxidized hemp oil with an epoxidation degree of more than 0.30 equivalent epoxy groups/100 g of oil was also particularly preferred as it allowed, by virtue of its greater activity in the tanning step, to use less reactive agents in the synthesis step, having to reach a lower epoxidation degree than in the case where other vegetable oils, such as soybean oil, were used.

Surprisingly, the inventors of the present invention have also discovered that the use of epoxidized vegetable oils in the tanning step allows to effectively conduct the tanning within a large spectrum of operating conditions, in particular the tanning is effective within the wide pH range from 3 to 6.

This is clearly a great advantage as it allows to choose the optimal pH conditions at which the other additives can also exhibit their maximum efficacy. The use of the epoxidized vegetable oils therefore makes the tanning step extremely flexible and modulable according to the characteristics of the leather to be treated and consequently of the additives to be used.

Not only that. By operating in this pH range, the inventors found out that it was possible to use no catalyst, as the reaction proceeded very well even spontaneously, leading to a very effective tanning.

In fact, by operating under these pH conditions and without any catalyst, the inventors found out that the leather resulting from the tanning step appeared to have a particularly high quality, thanks also to the fact that these pH values did not subject the leather to particular stress. Hence, its final qualitative characteristics once tanned appeared of particular value.

This made the tanning step carried out under these operating conditions much more advantageous and efficient, both for the lower use of chemicals, and for the fact that these softer reaction conditions made it possible to operate even more safely for operators.

Preferably in said tanning step the pH thus varies from 3 to 6.

In a particularly preferred condition of the invention said tanning step is carried out in a pH range from 3.5 to 4.5, more preferably from 3.7 to 4.3.

The Applicant has in fact surprisingly found that said pH range is optimal to allow the epoxidized vegetable oil to penetrate the leather fibres and irreversibly fixate itself in the leather being processed, allowing tanning, with incredibly performing results superior to those obtainable in other processing conditions.

Preferably, in said tanning step said epoxidized vegetable oil is used in an amount from 1% to 15% by weight, more preferably in an amount from 2% to 8% by weight, with respect to the weight of the leather being tanned.

Preferably, in the use according to the present invention, in a fixing step subsequent to the tanning step the pH is maintained at a value from 3.5 to 4.5.

In said fixing step, an acidic fixative agent is advantageously added, such as for example formic acid, acetic acid, citric acid.

Preferably, in said fixing step citric acid is used as a fixative agent of the epoxidized vegetable oil.

The Applicant has in fact surprisingly found that in the context of the use according to the present invention of epoxidized vegetable oils as tanning agents in the tanning step, it is in fact possible to improve the characteristics of tanned leather by using said specific acid, which acts both as an acidifier and as a cross-linking agent.

Preferably the acid is added in an amount from 1 to 5% by weight with respect to the weight of the leather being tanned, preferably from 2 to 3%.

Furthermore, it has surprisingly been found that said epoxidized vegetable oil can also be used in combination with other tanning agents typical of the tanning industry, without any undesirable reactions during the tanning step and therefore without any negative effects on the quality of the leather.

Excellent results were obtained, for example, by using epoxidized hemp oil in the tanning recipes in the presence of vegetable tannins, synthetic tannins, aluminium salts, chromium, aldehydes.

The use of epoxidized hemp oil in combination with synthetic tannins is particularly preferred.

Among the synthetic tannins, a synthetic tannin based on phenolsulfonic condensates and natural polyphenols is particularly preferred.

Thus, a particularly preferred embodiment of the invention is the one in which epoxidized hemp oil is used in combination with a synthetic tannin based on phenolsulfonic condensates and natural polyphenols.

Advantageously, said epoxidized hemp oil used in combination with a synthetic tannin based on phenolsulfonic condensates and natural polyphenols has an epoxidation degree of at least 0.30 equivalent epoxy groups/100 g of oil.

Alternatively, excellent results were obtained during the tanning step also using, in combination, various epoxidized vegetable oils, such as epoxidized hemp oil and epoxidized soybean oil.

Advantageously, said combination of epoxidized hemp oil and epoxidized soybean oil is used in combination with a synthetic tannin, preferably with a synthetic tannin based on phenolsulfonic condensates and natural polyphenols.

Epoxidized vegetable oils have therefore proved to be excellent tanning agents, which can be used not only alone or in combination with each other, but also in association with traditional tanners, allowing to obtain a considerable production flexibility during tanning, and thus allowing to adapt even the most traditional processes to this type of processing, modulating the characteristics and properties of the tanned leathers resulting from the treatment, on the basis of the specific mixtures of epoxidized vegetable oils used.

The epoxidized vegetable oil used as a tanning agent according to the present invention is preferably used in aqueous emulsion by adding an emulsifying agent.

During the industrial application of the epoxidized vegetable oils, it was found that said oils, due to their strongly lipophilic characteristics, tended not to mix adequately in the process conditions, in which the leather, in aqueous solution, is placed to react in drums kept in rotation.

The rotation of these drums, which cannot be increased at will, because this would have a negative effect on the quality of the leather that under these particularly stressful conditions could be ruined superficially, did not allow an effective mixing of the product, which tended, being oily, to stick to the walls of the drum, dirtying them, or to anoint, staining it, the part of leather with which it came into contact closest.

To reduce this effect, the epoxidized vegetable oil was then prepared in the form of an emulsion, so that, once added to the drum, it could be uniformly distributed in the solution, reacting with the leather fibres and effectively penetrating it without exhibiting the aforementioned drawbacks.

In a further aspect the present invention thus also relates to an aqueous emulsion comprising at least one epoxidized vegetable oil and at least one emulsifying agent.

The use in combination with an emulsifying agent in fact facilitates the contact of the epoxidized vegetable oil with the leather to be treated.

Preferably, the at least one epoxidized vegetable oil of the emulsion according to this aspect of the invention has the characteristics defined for the use of the epoxidized vegetable oil according to the first aspect of the invention.

An emulsion comprising an epoxidized hemp oil and at least one emulsifying agent is particularly preferred.

Suitable emulsifiers are for example the commercial surfactants Tween® 60 (polyoxyethylene sorbitan monostearate), Tween® 80 (polyoxyethylene sorbitan monooleate), Span™ 60 (sorbitan monostearate), Span™ 80 (sorbitan monooleate), and mixtures thereof.

An emulsifying mixture consisting of Tween® 80 and Span™ 80 is particularly preferred.

Advantageously, the aqueous emulsion comprises an amount from 1 to 10% by weight of emulsifier, preferably from 3 to 7%, even more preferably about 5% of emulsifier.

In particular, the inventors have found that it is possible to obtain stable aqueous emulsions when the emulsifier used is an emulsifier with HLB (Hydrophilic-Lipophilic Balance) comprised in the range of 9 to 13, preferably with HLB equal to 11.

Preferably in said tanning step said aqueous emulsion comprising the epoxidized vegetable oil and the emulsifier is used in an amount from 4% to 60% by weight, more preferably in an amount from 5% to 30% by weight, more preferably in an amount from 6% to 12% by weight with respect to the weight of the leather being tanned.

The epoxidized vegetable oil used as a tanning agent according to the present invention is preferably used in combination with a penetration-acting agent.

The Applicant has in fact surprisingly found that the use of a penetration-acting agent in combination with the epoxidized vegetable oil facilitates the adsorption of the latter in the leather to be treated.

Typical penetrating agents suitable for the purpose are for example the commercial products Suppletan MLR, MCR.

The tanning properties of the epoxidized vegetable oil surprisingly found by the Applicant, allow its use as a tanning agent in the leather processing processes of the tanning industry, and its successful integration with the subsequent processing steps of leather processing.

In a further and preferred aspect, the present invention further relates to a process for tanning a leather comprising the steps of:

(a) suspending a leather to be tanned in an aqueous medium;
(b) bringing the pH of said aqueous medium of step (a) to a value from 3 to 6; and
(c) contacting the leather of step (b) with at least one epoxidized vegetable oil.

The advantages and the characteristics of said further and preferred aspect of the invention, thanks to the use of an epoxidized vegetable oil as a tanning agent, have already been highlighted with reference to the first aspect of the invention itself and are not repeated herein.

Preferably, in said step (a) the leather to be tanned is subjected to one or more operations, for example selected from the group consisting of: soaking, fleshing, dehairing, liming, splitting, deliming, maceration, degreasing, pickling, depickling. Said operations may be carried out jointly or separately from each other in any manner known to the person skilled in the art and are therefore not further described herein.

Preferably, in said step (b) the pH is brought to a value from 3.5 to 4.5, more preferably from 3.7 to 4.3, even more preferably to about 4.

The Applicant has in fact surprisingly found that said pH range is optimal to allow the epoxidized vegetable oil to penetrate into the fibres of the leather and irreversibly fix itself in the leathers being processed, allowing them to be tanned.

In step (c) of the process according to this further and preferred aspect of the invention, the leather of step (b) is contacted with at least one epoxidized vegetable oil, which acts as a tanning agent, irreversibly fixing itself in the leathers being processed and preventing their putrefaction while maintaining the other technical characteristics of softness, flexibility, mechanical resistance, uniformity, elasticity and lightness.

Preferably in said step (c) the at least one epoxidized vegetable oil is epoxidized hemp oil.

Preferably, in said step (c) the epoxidized vegetable oil has an epoxidation degree of at least 0.10 equivalent epoxy groups/100 g of oil, more preferably of at least 0.15 equivalent epoxy groups/100 g of oil, even more preferably of at least 0.30 equivalent epoxy groups/100 g of oil.

Preferably in said step (c) said epoxidized vegetable oil is used in an amount from 1% to 15% by weight, more preferably in an amount from 2% to 8% by weight, with respect to the weight of the leather being tanned.

In said step (c) the epoxidized vegetable oil used is preferably used in combination with an emulsifying agent. The emulsifying agent in fact facilitates the contact of the epoxidized vegetable oil with the leather to be treated.

In said step (c) the epoxidized vegetable oil used is preferably used in combination with a synthetic tannin, preferably a tannin based on phenolsulfonic condensates and natural polyphenols.

The inventors found in particular that the use in step (c) of an epoxidized hemp oil in combination with a tannin based on phenolsulfonic condensates and natural polyphenols, at a pH comprised between about 3.7 and about 4.3, preferably about 4, allowed to obtain the best results in terms of performance of the treated leather.

In said step (c), the epoxidized vegetable oil used is preferably employed in combination with a penetration-acting agent.

The use of a penetration-acting agent in combination with the epoxidized vegetable oil facilitates the adsorption of the latter in the leather to be treated.

Preferably after the tanning step (c) of the process it follows a fixing step (d) wherein the pH is maintained at a value from 3.5 to 4.5.

Preferably, in said step (d) citric acid is used as a fixative agent of the epoxidized vegetable oil.

Said acid, which acts both as an acidifier and as a cross-linking agent, makes it possible to improve the characteristics of the tanned leather using an epoxidized vegetable oil as a tanning agent.

In an advantageous form of the invention, therefore, said process for tanning a leather comprises the steps of:

(a) suspending a leather to be tanned in an aqueous medium;
(b) bringing the pH of said aqueous medium of step (a) to a value from 3 to 6;
(c) contacting the leather of step (b) with at least one epoxidized vegetable oil;
(d) contacting the leather of step (c) with a fixative agent at a pH in the range of 3.5 to 4.5.

Advantageously, the process of the invention is carried out at a pH from 3.7 to 4.3 in step (b), employs a hemp epoxide in step (c) and citric acid as a fixative agent in step (d).

Preferably, downstream of step (d) of the process according to this further and preferred aspect of the invention the tanned leather is subjected to one or more operations for example selected from the group consisting of: greasing, dyeing, and finishing. Said operations may be carried out jointly or separately from each other in any manner known to the person skilled in the art and are therefore not further described herein.

The use of epoxidized vegetable oils also proved to bring enormous benefits in terms of the environmental impact of this type of industry.

When used as an alternative to the traditional tanning agents, in fact, the wastewaters of the industrial tanning treatments showed a BOD/COD ratio clearly higher than that found in the case of waste coming from standard tanning processes, making the waste more easily biodegradable in the subsequent biological treatments to which the waste is normally subjected.

In particular, the wastewater deriving from the processes according to the invention exhibited a ratio BOD/COD>40% unlike the waste coming from the standard processes that exhibited values of this ratio comprised in the range from 10 to 25%, therefore much lower.

The use of epoxidized vegetable oils is therefore advantageously effective not only in terms of the tanning treatment itself, but also in terms of environmental sustainability.

The tanning properties of the epoxidized vegetable oil according to the present invention do not confine the use thereof to the tanning step of the leather processing process of the tanning industry, but also allow its use also in the retanning step.

Preferably, in said retanning step said epoxidized vegetable oil is used in an amount from 0.5 to 15% by weight with respect to the weight of the leather subjected to retanning, preferably from 1 to 5%.

Said epoxidized vegetable oil according to the invention can be usefully used in the retanning step also in combination with one or more other known retanning agents, enhancing their activities and, on the basis of appropriate choices of their combinations, also allow a modulation of the final characteristics of the treated leather. Preferably, when used as a tanner in said retanning step, the epoxidized vegetable oil has an epoxidation degree of at least 0.10 equivalent epoxy groups/100 g of oil. In a further aspect the present invention further relates to an aqueous emulsion comprising at least one epoxidized hemp oil and at least one emulsifying agent.

The use of the epoxidized oil in an aqueous solution in combination with an emulsifying agent facilitates in fact the contact of the epoxidized vegetable oil with the leather to be treated, favouring its absorption and reactivity.

The advantages and preferred features of the emulsion according to this further aspect have already been described with reference to the first aspect of the invention and are therefore not repeated herein.

In a still further aspect, the present invention finally relates to the use of an epoxidized vegetable oil as a tanning agent in the leather retanning step.

The advantages and preferred features of the use according to this further aspect have already been described with reference to the first aspect of the invention and are therefore not repeated herein.

Further features and advantages of the invention will be more evident from the following Examples, which are intended only for illustrative and non-limiting purposes thereof.

EXPERIMENTAL PART

Materials and Methods

Hemp oil (*Cannabis Sativa* Species, product CANAH) with fatty acid profile, related parameters and iodine number ($gI_2$/100 g) as reported below:

TABLE 1

Characterization of Hemp Oil

| Fatty acid | [%] |
|---|---|
| Palmitic | 3.64 |
| Stearic | 2.86 |
| Oleic | 5.94 |
| Linoleic | 66.71 |
| Linolenic | 20.85 |
| Total monounsaturated | 5.90 |
| Total polyunsaturated | 87.56 |
| Total saturated | 6.50 |
| Average number of double bonds per mole | 5.4 |
| Average molecular weight (g/mol) | 876.17 |
| Iodine number (g $I_2$/100 g) | 88.8 |

Epoxidized soybean oil (Glycine Species, commercial product Kimasol DB) having the characteristics reported in Table 2 (ESO) below.

TABLE 2

Characterization of Epoxidized Soybean Oil

| Magnitude | Method | Unit of measurement | value |
|---|---|---|---|
| Acidity | CHF0365 | mgKOH/g | ≤0.5 |
| Oxirane number | IND2024 | % $O_2$ | 6.3-8.0 |
| Iodine number | CCHF0366 | g $I_2$/100 g | ≤3 |
| Colour Lovibond 5 ¼ G | CHF0367 | Lovibonf G | ≤10 |
| Colour Lovibond 5 ¼ R | CHF0367 | Lovibond R | ≤2 |
| Water | CHF0303 | % | ≤0.5 |
| Viscosity at 25° C. | ASTM D445 | cPs | 350-600 |
| Density at 25° C. | IND2006 | g/l | 980-1000 |

Example 1—Preparation of Epoxidized Hemp Oil ("EHO1")

250 g of hemp oil were introduced into a 500 mL flask provided with a dripper, to which were then added: a heterogeneous catalyst AMBERLIT 252 Na at 15% by weight with respect to the oil and previously activated in HCl (5% v/v), and glacial acetic acid. The solution in the flask was stirred and brought to a temperature of 40° C., finally hydrogen peroxide (30% vol. $H_2O_2$) was slowly added over a period of 1 hour, using the dripper placed on the reaction flask. The molar ratio between the reagents was as follows: oil:acetic acid:hydrogen peroxide=1:0.4:0.6. Once the hydrogen peroxide drip was finished, the temperature was increased up to 75° C. and said temperature was kept constant for a further 5 hours. Subsequently, the epoxidized hemp oil thus obtained was cooled up to room temperature (25° C.) and characterized to determine the epoxidation degree and the epoxide number, according to the methods described above (Table 1).

Example 2—Preparation of Epoxidized Hemp Oil ("EHO2")

400 g of hemp oil and 380 mL of $H_2O_2$ (30%) were introduced in a 2 L flask provided with a dripper and the mixture was stirred until homogeneous at room temperature. Subsequently, 27 mL of formic acid (85%) were added through the dripper placed on the reaction flask, at a rate of about 8-10 ml/min. The molar ratio between the reagents was as follows: oil:formic acid:hydrogen peroxide=1:0.25:

0.8. After the addition of formic acid, the temperature was gradually increased by about 5° C./10 min until 60° C. were reached, which was kept constant for a further 6 hours. Subsequently, the epoxidized hemp oil thus obtained was cooled up to room temperature (25° C.) and characterized to determine the epoxidation degree and the epoxide number, according to the methods described above. The results are reported in Table 1.

Example 3—Determination of the Epoxidation Degree and of the Number of Epoxides for Each of the Epoxidized Oils Used in the Tanning and Retanning Tests Table 3 below shows the epoxidation degree and the number of epoxides for each of the epoxidized oils used in the leather tanning and retanning tests, determined using the standard methods already stated.

TABLE 3

Epoxidation degree and epoxidation number of the epoxidized oils

| | Epoxidation degree (eq of epoxy groups/100 g) | Epoxide number (g O/100 g) |
|---|---|---|
| EHO1 | 0.18 | 2.88 |
| EHO2 | 0.34 | 5.44 |
| ESO | 0.42 | 6.72 |

Example 4—Tanning Tests with Epoxidized Hemp Oil

To evaluate the tanning effect of the epoxidized hemp oil alone, without using other auxiliary agents, three parallel tests were carried out using non-epoxidized hemp oil ("HO") and the two epoxidized hemp oils EHO1 and EHO2.

Preliminarily, the hemp oils used were prepared in the form of an emulsion, according to the following recipe:

Oil (HO, EHO1 or EHO2): 25% w/w

Emulsifier Tween® 80:2.65% w/w

Emulsifier Span™ 80 2.35% w/w

Water: 70% w/w.

The preparation procedure followed was as follows:

1. the emulsifiers were added to the oil and the whole was stirred at room temperature (25° C.) with Ultraturrax at about 1000 rpm until the mixture was homogenous;
2. water was gradually added to the mixture of step 1 and the whole was stirred at room temperature with Ultraturrax at 8000 rpm for 10 minutes.

The emulsified oils HOe, EHO1e and EHO2e were then obtained.

The tanning tests were then carried out in a trundler with said emulsified oils with pickled veal samples according to the recipe reported in Table 4.

TABLE 4

Basic recipe

| Step | Products (% = weight per 100 parts by weight of leather) | Conditions |
|---|---|---|
| Wetting back | 100% $H_2O$ at 25° C. + 10% NaCl | Rotation 10' + add leather to bath + Rotation 20' |

TABLE 4-continued

Basic recipe

| Step | Products (% = weight per 100 parts by weight of leather) | Conditions |
|---|---|---|
| Depickling | 1% sodium bicarbonate | Rotation 30' |
| | 1% sodium bicarbonate | Rotation 30' |
| | 1% sodium bicarbonate | Rotation 60', control pH 7-7.5 |
| Tanning | 30% HOe, EHO1e or EHO2e + 5% NaCl | Rotation 16 h (night), control pH 5-5.5 and drain bath |
| Fixation by acidification | 100% $H_2O$ at 30° C. + 1% formic acid | Rotation 60', control pH 4-4.2 |
| | 1% formic acid | Rotation 240', control pH 3.5-3.6 and drain bath |

At the end of the processing, the gelatinization temperature (Tg or shrinkage) was determined to verify that the tanning had taken place. The results are reported in Table 5 together with the epoxidation degree, which was also determined on HO as a control:

TABLE 5

Gelatinization temperature

| Sample | Epoxidation degree (eq of epoxy groups/100 g) | Tg (° C.) |
|---|---|---|
| HOe | 0 | 44 |
| EHO1e | 0.18 | 49 |
| EHO2e | 0.34 | 55 |

As can be seen from the data in Table 3, the leather subjected to the process in the absence of tanning agents, i.e. treated with non-epoxidized hemp oil (HOe), exhibited a low Tg, around 44° C., which is characteristic of an untanned leather.

On the other hand, the tanning capacity of the epoxidized vegetable oils was observed and it was also possible to observe that the epoxidation degree was correlated with the shrinkage temperature found on the leather after treatment.

In particular, as the epoxidation degree of hemp oil increased, there was an increase in the shrinkage temperature and thus a greater tanning effect.

Example 5—Tanning Tests with Penetration-Acting Agent

Example 4 was repeated by adding, in the tanning step, the synthetic auxiliary of a phenolic nature with penetrating action Suppletan MRL, and also by testing the epoxidized soybean oil in the form of an emulsion (ESOe), also prepared as described in Example 4.

The conditions are reported in Table 6.

TABLE 6

Recipe with penetrating agent

| Step | Products (% = weight per 100 parts by weight of leather) | Conditions |
|---|---|---|
| Wetting back | 100% H2O at 25° C. + 10% NaCl | Rotation 10' + add leather to bath + Rotation 20' |

TABLE 6-continued

| Recipe with penetrating agent | | |
|---|---|---|
| Step | Products (% = weight per 100 parts by weight of leather) | Conditions |
| Depickling | 1% sodium bicarbonate | Rotation 30' |
| | 1% sodium bicarbonate | Rotation 30' |
| | 1% sodium bicarbonate | Rotation 60', control pH 7-7.5 |
| Tanning | 30% HOe or EHO1e or EHO2e or ESOe + 5% NaCl + 2% penetrating agent (Suppletan MRL) | Rotation 16 h (night), control pH 5-5.5 and drain bath |
| Fixation by acidification | 100% H2O at 30° C. + 1% formic acid | Rotation 60', control pH 4-4.2 |
| | 1% formic acid | Rotation 240', control pH 3.5-3.6 and drain bath |

At the end of the processing, the gelatinization temperature (Tg or shrinkage) was determined to verify that the tanning had taken place. The results are reported in Table 7 together with the epoxidation degree.

TABLE 7

| Gelatinization temperature vs epoxidation degree | | |
|---|---|---|
| Sample | Epoxidation degree (eq of epoxy groups/100 g) | Tg (° C.) |
| HOe | 0 | 44 |
| EHO1e | 0.18 | 53 |
| EHO2e | 0.34 | 58 |
| ESOe | 0.42 | 61 |

As evident from the results reported in Table 5, the addition of a penetrating agent favoured the dispersion of the tanning agents within the leather fibres improving the yield of the tanning step.

In fact, significantly higher Tg values were obtained in the presence of the penetrating agent.

In addition, even with the addition of the penetrating agent that favoured the absorption of the products, an increasing tanning capacity continued to be found according to the epoxidation degree of the hemp oil used. In fact, in the case of use of the soybean oil with a higher epoxidation degree (ESOe), the highest Tg values were obtained.

It was also observed that the tests carried out with EHO2e and ESOe allowed to obtain gelatinization temperature values greater than 55° C., which was particularly significant as it was indicative of obtaining a tanned leather with mechanical characteristics that integrate optimally with the subsequent processing steps.

Example 6—Tanning Tests with Citric Acid During the Fixing Step

Example 5 was repeated using the epoxidized and emulsified hemp oil from Example 4 (EHO2e) and the epoxidized and emulsified soybean oil (ESOe) as tanning agents, using citric acid instead of formic acid in the fixing step, i.e. using an acid with cross-linking capabilities in addition to the necessary acidifying properties.

The conditions are reported in Table 8.

TABLE 8

| Recipe with penetrating agent and citric acid | | |
|---|---|---|
| Step | Products (% = weight per 100 parts by weight of leather) | Conditions |
| Wetting back | 100% H2O at 25° C. + 10% NaCl | Rotation 10' + add leather to bath + Rotation 20' |
| Depickling | 1% sodium bicarbonate | Rotation 30' |
| | 1% sodium bicarbonate | Rotation 30' |
| | 1% sodium bicarbonate | Rotation 60', control pH 7-7.5 |
| Tanning | 30% ESOe or EHO2e + 5% NaCl + 2% penetrating agent (Suppletan MRL) | Rotation 16 h (night), control pH 5-5.5 and drain bath |
| Fixation by acidification | 100% H2O at 35° C. + 1% citric acid | Rotation 30' |
| | 0.5% citric acid | Rotation 30' |
| | 0.5% citric acid | Rotation 30' |
| | 0.5% citric acid | Rotation 240' control pH 3.6-4 |

At the end of the processing, the gelatinization temperature (Tg or shrinkage) was determined. The results are reported in Table 9.

TABLE 9

| Gelatinization temperature | |
|---|---|
| Sample | Tg (° C.) |
| EHO2e | 68 |
| ESOe | 72 |

It was possible to observe the achievement of very high Tg values, completely superimposable to those typical of leathers that are vegetable-tanned or tanned with organic tanners (eg. aldehydes and synthetic tannins).

The use of citric acid in the tanning recipe therefore further favoured the tanning activity of the epoxidized vegetable oils, which were particularly active in these reaction conditions.

Example 7—Tanning Tests with Epoxidized Hemp Oil in Combination with Other Tanning Agents Example 6 was repeated with EHO2e and using in the tanning step the commercial product SUPPLETAN ADF, a traditional aldehyde type tanning agent (adduct aldehyde-disulfone).

The conditions are reported in Table 10.

TABLE 10

| Recipe with penetrating citric acid and other tanning agent | | |
|---|---|---|
| Step | Products (% = weight per 100 parts by weight of leather) | Conditions |
| Wetting back | 100% H2O at 25° C. + 10% NaCl | Rotation 10' + add leather to bath + Rotation 20' |
| Depickling | 1% sodium bicarbonate | Rotation 30' |
| | 1% sodium bicarbonate | Rotation 30' |
| | 1% sodium bicarbonate | Rotation 60', control pH 7-7.5 |
| Tanning | 30% EHO2e + 5% NaCl + 2% penetrating agent (Suppletan MRL) | Rotation 16 h (night), control pH 5-5.5 and drain bath |
| | 100% H2O at 30° C. + 1% formic acid | Rotation 60' control pH 4.2 |

TABLE 10-continued

| Recipe with penetrating citric acid and other tanning agent | | |
|---|---|---|
| Step | Products (% = weight per 100 parts by weight of leather) | Conditions |
| | 3% SUPPLETAN ADF | Rotation 240' control pH 4.3-4.5 |
| Fixation by acidification | 0.5% citric acid | Rotation 60' |
| | 0.5% citric acid | Rotation 60' |
| | 1% citric acid | Rotation 60' control pH 3.6 |

At the end of the processing, the gelatinization temperature (Tg or shrinkage) was determined. The results are reported in Table 11.

TABLE 11

| Gelatinization temperature vs epoxidation degree | |
|---|---|
| Sample | Tg (° C.) |
| EHO2e | 78-80 |

Also in this case it was possible to observe the achievement of very high Tg values, completely superimposable to those typical of leathers that are vegetable-tanned or tanned with organic tanners (eg. aldehydes and synthetic tannins).

The same tests were carried out using EHO2e in combination with other traditional tanning agents, such as natural tannins, synthetic tannins, aldehydes, metals such as chromium, aluminium salts, always obtaining Tg values never lower than 55° C.

This proved beyond doubt that not only epoxidized vegetable oils are excellent tanning agents, but that they can be used without any risk in combination with all the other traditional tanning agents known, to modulate the operating conditions of the tanning step and consequently the properties of the tanned leather obtainable by it.

Example 8—Tanning Tests with Epoxidized Soybean Oil (ESOe) in which the Tanning Step was Carried Out at Low pH Values In this case, the tanning was carried out using epoxidized and emulsified soybean oil (ESOe), modifying the tanning recipe so as to work at much lower pH than ordinary ones.

The tanning recipe is reported in Table 12 below.

TABLE 12

| Retanning recipe | | |
|---|---|---|
| Step | Products (% = weight per 100 parts by weight of leather) | Conditions |
| Deliming | 100% $H_2O$ at 30° C. + 0.2% ammonium sulphate + 0.1% degreaser | Rotation 30' |
| Deliming | 0.2% of ammonium sulphate + 0.3% of sodium metabisulphite | Rotation 30' then drain |
| Deliming | 60% $H_2O$ at 30° C. + 1% Deliming VT + 0.5% of ammonium sulphate + 0.5% of sodium metabisulphite + 0.1% degreaser | pH 8-8.5 Rotation 90' Lime control |

TABLE 12-continued

| Retanning recipe | | |
|---|---|---|
| Step | Products (% = weight per 100 parts by weight of leather) | Conditions |
| Maceration | 40% $H_2O$ at 40° C. + 0.3% Rezym S + 0.1% degreaser | pH 8-8.5 Rotation 60' Maceration control Drain |
| Washing | 100% $H_2O$ at 20° C. + 1% hydrogen peroxide | Rotation 30' then drain |
| Washing | 150% $H_2O$ at 20° C. | Then drain |
| Pickling | 30% $H_2O$ at 20° C. + 6% NaCl + 1% Coriol X6 + 0.2% Anti-mould | 7-8 Be Rotation 15' |
| Pickling | 0.6% formic acid | Rotation 30' |
| Pickling | 0.6% formic acid | Rotation 30' |
| Pickling | 0.6% formic acid | Rotation 60' pH = 3.4-3.6 |
| tanning | 8% ESOe | Rotation 300' (automatic night rotation) |
| tanning | 2% biodegradable tanning resin | Rotation 120' |
| tanning | 6% synthetic tanning agent | Rotation 180' |
| fixation | 0.3% natural acid | Rotation 30' |
| fixation | 0.3% natural acid | Rotation 30' |
| fixation | 0.4% natural acid | Rotation 60' |
| Final tanning | 2% CORRECTAN BD/SS + 0.2% NEMOCITE | Rotation 120' Then drain, hold |

Example 9—Retanning Test with EHO2e

To evaluate the retanning effect of the epoxidized hemp oil, a test was carried out in which EHO2e was added to a standard recipe using natural and synthetic tannins as retanning agents.

The retanning tests were carried out in a trundler with tanned lamb samples according to the procedure described in Example 6.

The retanning recipe is reported in Table 13 below.

TABLE 13

| Retanning recipe | | |
|---|---|---|
| Step | Products (% = weight per 100 parts by weight of leather) | Conditions |
| Degreasing | 200% $H_2O$ at 35° C. + 0.5% Belipon OC | Rotation 30'; then drain |
| Retanning | 100% $H_2O$ at 40° C. + 3% EXP 34/RV (biodegradable tanning resin) | Rotation 30' |
| Retanning | 4% EXP 16/A2 (synthetic tanning agent) | Rotation 30' |
| Retanning | 3% EHO2e + 3% Connectan GN + 3% Nemotan Auto/SS + 3% Suppletan RB/FA | Rotation 30' |
| Greasing | 5% Connectan PC + 3% Lorewoil CSP + 2% Nemostop 42 + 2% LA33 | Rotation 30' |
| Retanning | 3% EHO2e + 3% Connectan GN + 3% Nemotan Auto/SS + 3% Suppletan RB/FA | Rotation 180'; then in the morning another rotation for 10' |
| Fixation | 100% $H_2O$ a 40° C. + 1% Oxalic acid | Rotation 30'; then drain and wash |
| Greasing | 150% $H_2O$ at 50° C. + 5% Connectan PC + 3% Lorewoil CSP + 3% Nemostop 42 + 2% LA33 | Rotation 30' |

TABLE 13-continued

| Retanning recipe | | |
|---|---|---|
| Step | Products (% = weight per 100 parts by weight of leather) | Conditions |
| Retanning | 3% EHO2e + 3% Connectan GN + 3% Nemotan Auto/SS + 3% Suppletan RB/FA | Rotation 90' |
| Fixation | 1% Formic acid | Rotation 30'; then cool dyeing |

At the end of the retanning treatment, the characteristics of the leather obtained were evaluated and, compared to the standard recipe that did not require the use of EHO2e, a clear superiority of its qualities in terms of fullness, tear resistance, blowing, lightfastness and softness was found.

Example 10—Tanning Tests with Emulsified Epoxidized Hemp Oil (EOH2e) and Emulsified Epoxidized Soybean Oil (ESOe) Wherein the Tanning Step was Carried Out at Low pH Values In this case, the tanning was carried out using a combination of emulsified epoxidized hemp oil (EOH2e) and emulsified epoxidized soybean oil (ESOe).

The tanning recipe is reported in Table 14 below.

TABLE 14

| Retanning recipe | | |
|---|---|---|
| Step | Products (% = weight per 100 parts by weight of leather) | Conditions |
| Deliming | 100% $H_2O$ at 30° C. + 0.2% ammonium sulphate + 0.1% degreaser | Rotation 30' |
| Deliming | 0.2% of ammonium sulphate + 0.3% of sodium metabisulphite | Rotation 30' then drain |
| Deliming | 60% $H_2O$ at 30° C. + 1% Deliming VT + 0.5% of ammonium sulphate + 0.5% of sodium metabisulphite + 0.1% degreaser | pH 8-8.5 Rotation 90' Lime control |
| Maceration | 40% $H_2O$ at 40° C. + 0.3% Rezym S + 0.1% degreaser | pH 8-8.5 Rotation 60' Maceration control Drain |
| Washing | 100% $H_2O$ at 20° C. + 1% hydrogen peroxide | Rotation 30' then drain |
| Washing | 150% $H_2O$ at 20° C. | Then drain |
| Pickling | 30% $H_2O$ at 20° C. + 6% NaCl + 1% Coriol X6 + 0.2% Anti-mould | 7-8 Bè Rotation 15' |
| Pickling | 0.6% formic acid | Rotation 30' |
| Pickling | 0.6% formic acid | Rotation 30' |
| Pickling | 0.6% formic acid | Rotation 60' pH = 3.4-3.6 |
| tanning | 4% EOH2e 4% ESOe | Rotation 300' (automatic night rotation) pH = 3.9-4.1 |
| tanning | 7% synthetic tannin tanning agent | Rotation 180' |
| fixation | 0.3% natural acid | Rotation 30' |
| fixation | 0.3% natural acid | Rotation 30' |
| fixation | 0.4% natural acid | Rotation 60' |
| Final tanning | 2% CORRECTAN BD/SS + 0.2% NEMOCITE | Rotation 120' Then drain, hold |

The use of the combination of emulsified epoxidized hemp oil and emulsified epoxidized soybean oil also produced a tanned leather with excellent performance.

Example 11—Tanning Tests with Emulsified Epoxidized Hemp Oil (EOH2e), or a Combination of Emulsified Epoxidized Hemp Oil (EOH2e) and Emulsified Epoxidized Soybean Oil (ESOe), in Combination with a Synthetic Tannin at Low pH Values In this case the tanning was carried out on a leather previously subjected to pikel, characterized by a pH of about 3-3.2 at the end of treatment.

In the same drum in which the pikel was carried out, and after having discharged about ⅓ of water, the next steps were carried out, as reported in the following table 15.

This time, as indicated in the table, emulsified epoxidized hemp oil (EOH2e) was used in the tanning step followed by a synthetic tannin (the commercial product Keltan NC/20 based on phenolsulfonic condensates and natural polyphenols).

Citric acid was used during the fixing step.

TABLE 15

| Recipe with synthetic tannin and citric acid | | |
|---|---|---|
| Step | Products (% = weight per 100 parts by weight of leather) | Conditions |
| Depickling | 0.5% sodium acetate | Rotation 45' - pH 3.4-3.6 |
| | 0.5% sodium acetate | Rotation 45' - pH 3.8-4.0 |
| Tanning | 8% EHO2e + | Rotation 5 h, control pH 3.4-3.6 |
| | 6% synthetic tannin Keltan NC/20 | Rotation 4 h and then in automatic mode overnight |
| Fixation by acidification | 0.5% citric acid | Rotation 30' - pH 3.6-3.8 |
| | 0.5% citric acid | Rotation 60'- pH 3.4-3.6 |
| | 2% Keltan ITM | Rotation 3 h- pH 3.5-3.7 |
| | 0.2% anti-mould | |

At the end of the processing, the gelatinization temperature was determined; a Tg value equal to 69° C. was obtained, which is completely comparable to those typical of leathers that are vegetable-tanned or tanned with organic tanners.

The same recipe was carried out by replacing 8% of emulsified epoxidized hemp oil with a mixture of 4% of emulsified epoxidized hemp oil and 4% of emulsified epoxidized soybean oil. Also in this case an excellent result was obtained with a leather Tg value equal to 68° C.

These tanning conditions were repeated on various leather samples, even of different origin, and the results showed that this type of recipe, in which emulsified epoxidized hemp oil was used in the tanning step, alone or in combination with emulsified epoxidized soybean oil, in combination with a synthetic tannin, preferably based on phenolsulfonic condensates and natural polyphenols, at pH values around 4, followed by a fixing step with citric acid, resulted in leather performances that were the best so far achieved.

The tests thus showed that the epoxidized vegetable oils according to the invention, preferably in emulsified form, could be usefully and effectively used both as tanning and retanning agents, either alone or in combination with each other, or in combination with other traditional tanning or retanning agents, giving the leathers thus treated excellent qualitative characteristics, moreover employing industrial processes with a lower environmental impact than traditional ones.

The invention claimed is:

1. A method of using an aqueous emulsion as a tanning agent in at least one step of a leather processing process of the tanning industry, wherein said method comprises:
   (a) suspending a leather to be tanned in an aqueous medium; and
   (b) contacting the leather with an aqueous emulsion comprising at least one epoxidized vegetable oil and at least one emulsifying agent, wherein said emulsifying agent is selected from the group consisting of: polyoxyethylene sorbitan monostearate, polyoxyethylene sorbitan monooleate, sorbitan monostearate, sorbitan monooleate and mixtures thereof.

2. The method according to claim 1, wherein said epoxidized vegetable oil is selected from the group consisting of: epoxidized hemp oil, epoxidized soybean oil, epoxidized sunflower oil, epoxidized olive oil, epoxidized linseed oil, epoxidized cotton oil, epoxidized karanja oil, epoxidized castor oil, epoxidized peanut oil, epoxidized corn oil, epoxidized rapeseed oil and combinations thereof.

3. The method according to claim 2, wherein said epoxidized vegetable oil is epoxidized hemp oil, epoxidized soybean oil or a combination thereof.

4. The method according to claim 1, wherein said epoxidized vegetable oil has an epoxidation degree of at least 0.10 equivalent epoxy groups/100 g of oil.

5. The method according to claim 1, wherein the aqueous emulsion comprises an amount from 1 to 10% by weight of emulsifier.

6. The method according to claim 1, wherein said emulsifying agent has an HLB (Hydrophilic-Lipophilic Balance) comprised in the range from 9 to 13.

7. The method according to claim 1, wherein said at least one step of the leather processing process is a tanning step where the pH is maintained at a value from 3 to 6.

8. The method according to claim 7, wherein in a fixing step subsequent to the tanning step the pH is brought to a value from 3.5 to 4.5 and in said fixing step an acid is used as a fixative agent of the epoxidized vegetable oil.

9. The method according to claim 8, wherein in said fixing step the acid is citric acid.

10. The method according to claim 7, wherein in said tanning step said epoxidized vegetable oil is used in an amount from 1% to 15% by weight, with respect to the weight of the leather being tanned.

11. The method according to claim 1, wherein said epoxidized vegetable oil is used in combination with a penetration-acting agent.

12. The method according to claim 1, wherein said epoxidized vegetable oil is used in combination with one or more other tanning agents selected from the group consisting of vegetable tannins, synthetic tannins, aluminium salts, chromium and aldehydes.

13. The method according to claim 1, wherein said epoxidized vegetable oil is used in combination with a synthetic tannin based on a phenolsulfonic condensate and natural polyphenols.

14. The method according to claim 1, wherein said at least one step of the leather processing process is a retanning step.

15. The method according to claim 14, wherein said epoxidized vegetable oil is used in combination with one or more other retanning agents selected from the group consisting of vegetable tannins, synthetic tannins, aluminium salts, chromium and aldehydes.

16. A process for tanning a leather comprising the steps of:
   (a) suspending a leather to be tanned in an aqueous medium;
   (b) bringing the pH of said aqueous medium of step (a) to a value from 3 to 6; and
   (c) contacting the leather of step (b) with at least one epoxidized vegetable oil, wherein the epoxidized vegetable oil is added in the form of an aqueous emulsion comprising at least one epoxidized vegetable oil and at least one emulsifying agent, wherein said emulsifying agent is selected from the group consisting of: polyoxyethylene sorbitan monostearate, polyoxyethylene sorbitan monooleate, sorbitan monostearate, sorbitan monooleate and mixtures thereof.

17. The process according to claim 16, wherein said aqueous emulsion is added in an amount from 6 to 12% by weight, with respect to the weight of the leather being tanned.

18. The process according to claim 16, comprising after step (c) a further fixing step (d) wherein the pH of step (c) is maintained at a value from 3.5 to 4.5.

19. The process according to claim 16, wherein in said step (c) said epoxidized vegetable oil is used in an amount from 1% to 15% by weight, with respect to the weight of said leather.

20. The process according to claim 16, wherein said at least one epoxidized vegetable oil has an epoxidation degree of at least 0.10 equivalent epoxy groups/100 g of oil.

21. The process according to claim 16, wherein the pH of step (b) is brought to a value comprised between 3.7 and 4.3, the epoxidized vegetable oil of step (c) is epoxidized hemp oil, used in combination with a synthetic tanning based on phenolsulfonate condensate and natural polyphenols, and said tanning is followed by said step (d) of fixing in which citric acid is used.

22. The process according to claim 21, wherein the epoxidized vegetable oil of step (c) is epoxidized hemp oil in the form of an aqueous emulsion.

23. An aqueous emulsion comprising at least one epoxidized hemp or vegetable oil and at least one emulsifying agent, wherein said emulsifying agent is selected from the group consisting of: polyoxyethylene sorbitan monostearate, polyoxyethylene sorbitan monooleate, sorbitan monostearate, sorbitan monooleate and mixtures thereof, and wherein said emulsifying agent has an HLB (Hydrophilic-Lipophilic Balance) comprised in the range of 9 to 13.

* * * * *